United States Patent
Venditte

(10) Patent No.: US 10,096,262 B1
(45) Date of Patent: Oct. 9, 2018

(54) VEHICLE ROLL-OVER SIMULATOR

(71) Applicant: Patrick L. Venditte, Omaha, NE (US)

(72) Inventor: Patrick L. Venditte, Omaha, NE (US)

( * ) Notice: Subject to any disclaimer, the term of this patent is extended or adjusted under 35 U.S.C. 154(b) by 0 days.

(21) Appl. No.: 15/602,704

(22) Filed: May 23, 2017

(51) Int. Cl.
  *G09B 9/04* (2006.01)
  *G09B 19/14* (2006.01)
(52) U.S. Cl.
  CPC ............. *G09B 19/14* (2013.01); *G09B 9/04* (2013.01)
(58) Field of Classification Search
  USPC ............ 434/29, 61, 62, 66, 67, 68, 219, 226
  See application file for complete search history.

(56) References Cited

U.S. PATENT DOCUMENTS

| | | | | |
|---|---|---|---|---|
| 6,142,877 A | * | 11/2000 | Nishimura | A63F 13/08 434/62 |
| 8,758,016 B1 | * | 6/2014 | Henriksson | G09B 19/16 434/29 |
| 2007/0020587 A1 | * | 1/2007 | Seymore | G09B 9/02 434/29 |
| 2015/0371549 A1 | * | 12/2015 | Alonso | G09B 9/00 434/219 |
| 2016/0042655 A1 | * | 2/2016 | Sweet | G09B 23/30 434/267 |

\* cited by examiner

*Primary Examiner* — Kurt Fernstrom
(74) *Attorney, Agent, or Firm* — Dennis L. Thomte; Thomte Patent Law Office LLC

(57) ABSTRACT

A vehicle roll-over simulator including a portable support frame having a driver seat positioned thereon for supporting a person thereon. The driver seat is selectively movable between an upright position to a roll-over position thereby simulating a vehicle roll-over situation. The simulator demonstrates the need for persons to utilize seat belts when in a vehicle.

13 Claims, 6 Drawing Sheets

VEHICLE ROLL-OVER SIMULATOR

BACKGROUND OF THE INVENTION

Field of the Invention

This invention relates to a vehicle roll-over simulator and more particularly to a vehicle roll-over simulator which is portable so as to be movable from location to location. Even more particularly, this invention relates to a vehicle roll-over simulator wherein a person such as a student may be strapped thereinto and then roiled-over to simulate a vehicle roll-over situation.

Description of the Related Art

Many types of vehicle roll-over simulators have been previously provided. To the best of Applicant's knowledge, all of those simulators involve a vehicle body wherein life-size dummies are placed therein and are initially secured therein by seat belts. As the simulator is rolled over, the dummies remain within the simulator to demonstrate the need for persons in a vehicle to fasten their seat belts. The seat belts of the dummies are then disconnected and the simulator is rolled-over which results in the dummies being ejected from the simulator to demonstrate what happens in a vehicle roll-over situation when the occupants of the vehicle do not use seat belts. That demonstration is sometimes reversed.

Further, the prior art vehicle roll-over simulators do not utilize live students or persons. Additionally, the prior art simulators are not readily movable into a classroom and which are not easily moved to other classrooms or other locations. Additionally, the prior art simulators do not permit a student or person to personally experience the vehicle roll-over effect when securely positioned within a vehicle by a seat belt assembly.

SUMMARY OF THE INVENTION

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

A vehicle roll-over simulator is disclosed which comprises a horizontally disposed lower support frame which is configured to be positioned on a horizontally disposed surface. A vertically disposed support post extends upwardly from the lower support frame at the rear end thereof. A horizontally disposed drive shaft is rotatably mounted on the upper end of the support post with the drive shaft having a rear end and a front end. A drive means is connected to the drive shaft for selectively rotating the drive shaft in at least a first direction. A driver support frame is secured to the front end of the drive shaft for rotation therewith about a horizontal axis. A driver seat is mounted on the driver support frame. A foot support frame is secured to the front end of the driver support frame and includes a foot rest positioned forwardly of and below the seat portion of the driver seat. A steering wheel support is secured to the front end of the foot support frame. A steering wheel is mounted on the steering wheel support.

The driver support frame, the driver seat, the foot support frame and steering wheel support are selectively rotatable from an upright position to a roll-over position by the drive shaft. A seat belt assembly or restraint belt assembly is provided for securing a person on the driver seat to maintain the person on the driver seat while the driver support frame is rotatably moved between the upright position to the roll-over position thereby simulating a vehicle roll-over situation.

It is therefore a principal object of the invention to provide a vehicle roll-over simulator wherein a student or person is securely and safely held therein by a restraint belt assembly which includes seat belts and shoulder belts.

A further object of the invention is to provide a portable vehicle roll-over simulator.

A further object of the invention is to provide a portable vehicle roll-over simulator which is easily moved from classroom to other classrooms or other locations.

Yet another object of the invention is to provide a vehicle roll-over simulator which enables a person to experience a vehicle roll-over situation.

Yet another object of the invention is to provide a vehicle roll-over simulator which may be broken down into smaller components to enable the simulator to be easily moved from one location to another location.

These and other objects will be apparent to those skilled in the art.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DESCRIPTION OF THE PREFERRED EMBODIMENT

Embodiments are described more fully below with reference to the accompanying figures, which form a part hereof and show, by way of illustration, specific exemplary embodiments. These embodiments are disclosed in sufficient detail to enable those skilled in the art to practice the invention. However, embodiments may be implemented in many different forms and should not be construed as being limited to the embodiments set forth herein. The following detailed description is, therefore, not to be taken in a limiting sense in that the scope of the present invention is defined only by the appended claims.

Figure 1:
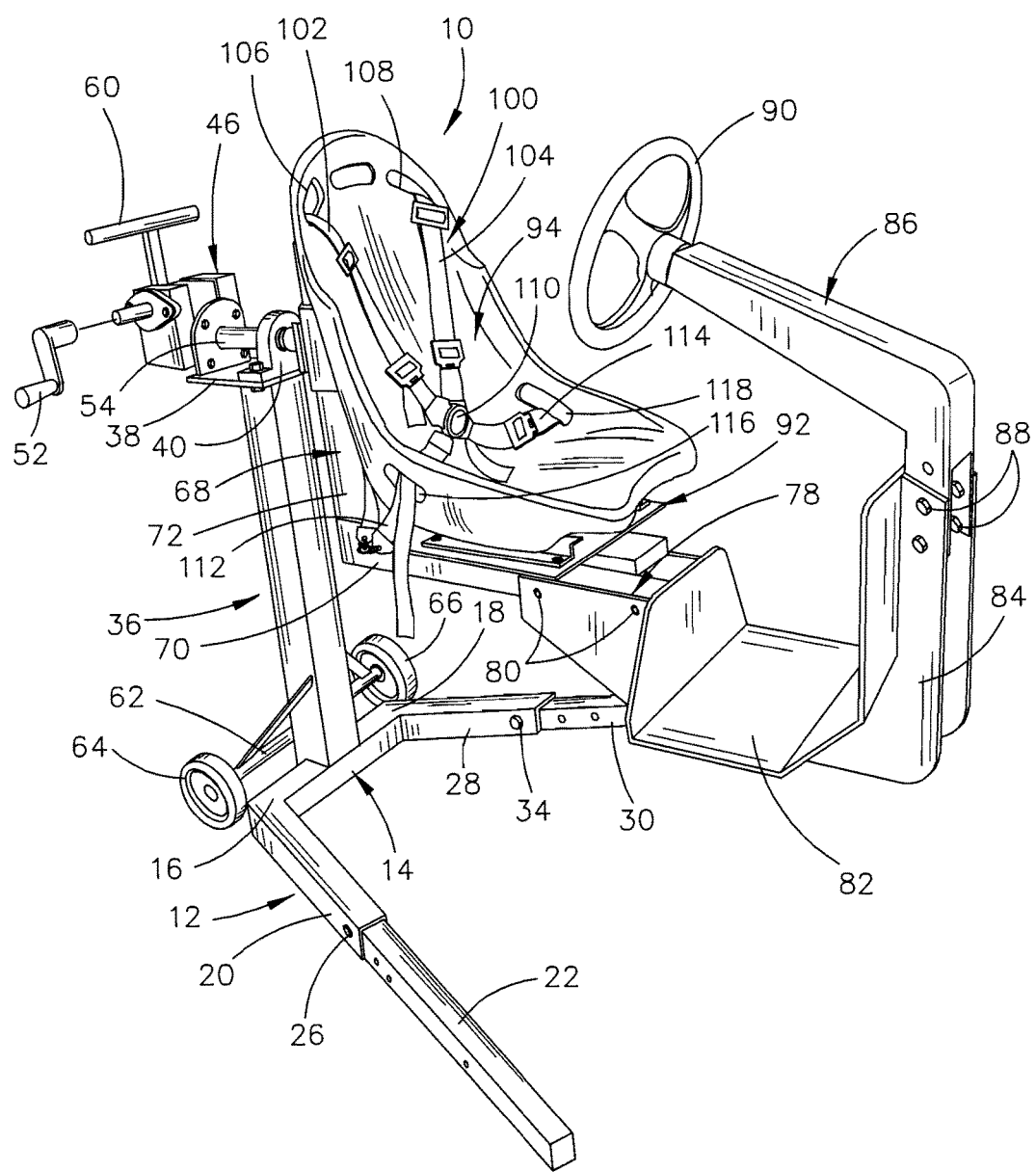
FIG. 1 is a perspective view of the roll-over simulator of this invention.

The numeral 10 refers to the vehicle roll-over simulator of this invention. Simulator 10 includes a horizontally disposed lower support frame 12 which includes a tubular base frame member 14 having ends 16 and 18. Tubular frame member 20 extends laterally and outwardly from end 16 of frame member 14. A tubular frame member 22 has its inner or rearward end 24 longitudinally adjustably and selectively removably received in frame member 20 and held therein by pin or bolt 26 as illustrated in FIG. 1. A tubular frame member 28 extends laterally and outwardly from end 18 of frame member 14. A tubular frame member 30 has its inner or rearward end 32 longitudinally adjustably and selectively removably received in frame member 28 and held therein by pin or bolt 34 as illustrated in FIG. 1.

An upstanding support post 36 has its lower end secured to frame member 14 and extends upwardly therefrom. A support plate 38 is secured to and is mounted on the upper end of post 36. A pillow bearing 40 is secured to support plate 38 by bolts. The numeral 46 refers to a manually operated gear box having a rotatably drive shaft 48 extending forwardly therefrom. A rotatable power shaft 50 extends outwardly therefrom. The rotation of shaft 50 causes rotation of shaft 48 in conventional fashion in either direction. A crank handle 52 is selectively removably secured to shaft 50 to enable shaft 48 to be manually rotated. The gear box 46 could be replaced by an electric motor, an electric motor gear box, a reversible electric motor, or a variable speed electric motor. Shaft 54 is rotatably mounted in bearing 40 and has its rear end 56 connected to shaft 48 for rotation therewith. The forward end of shaft 54 has a bracket 58 fixed thereto.

A T-shaped handle 60 is secured to gear box 46 and extends upwardly therefrom. A horizontally disposed support arm 62 is secured to the rearward side of post 36 at the lower end thereof. Wheels 64 and 66 are rotatably mounted on the ends of support arm 62.

Figure 2:
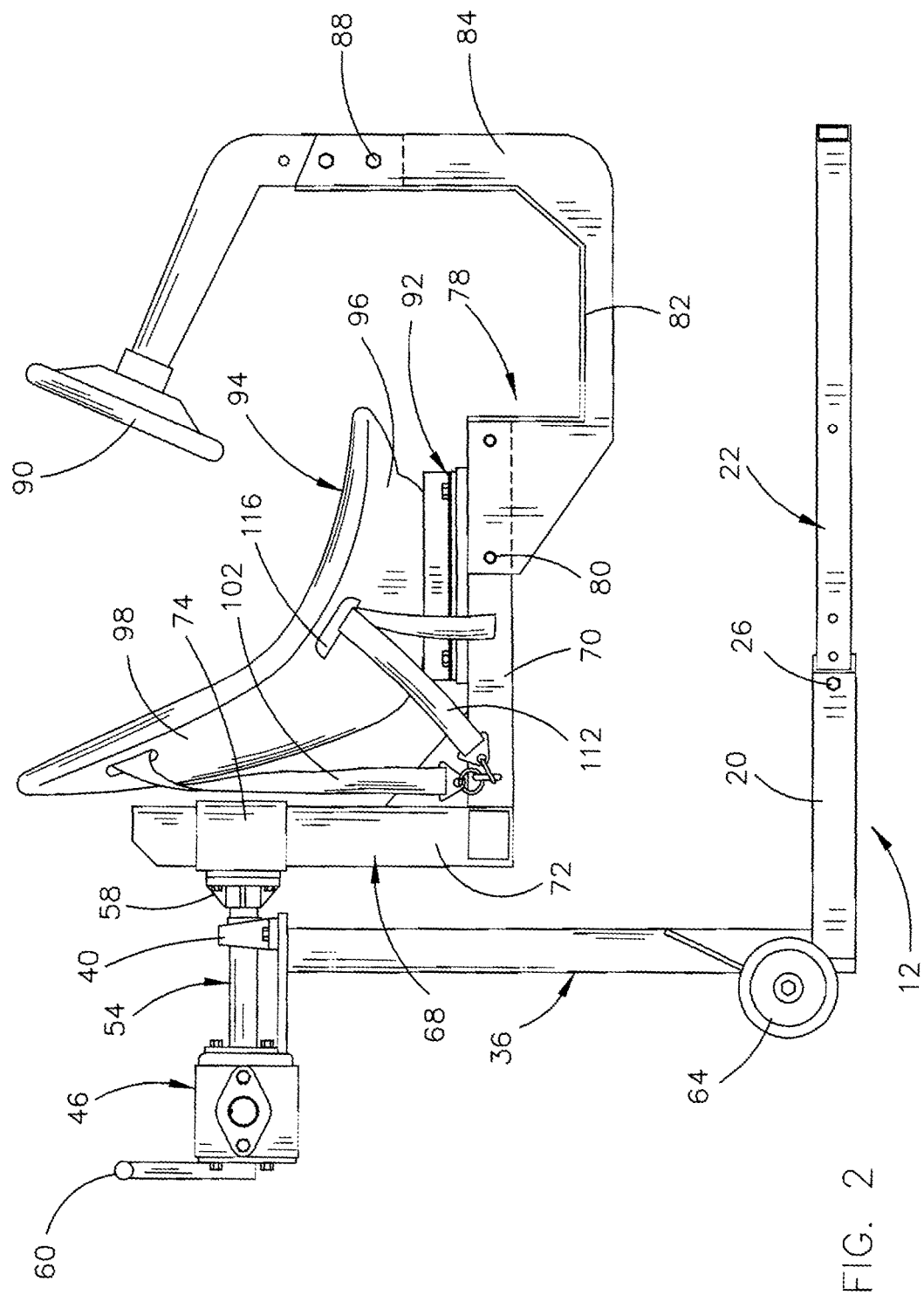
FIG. 2 is a side view of the roll-over simulator of this invention.
Figure 3:
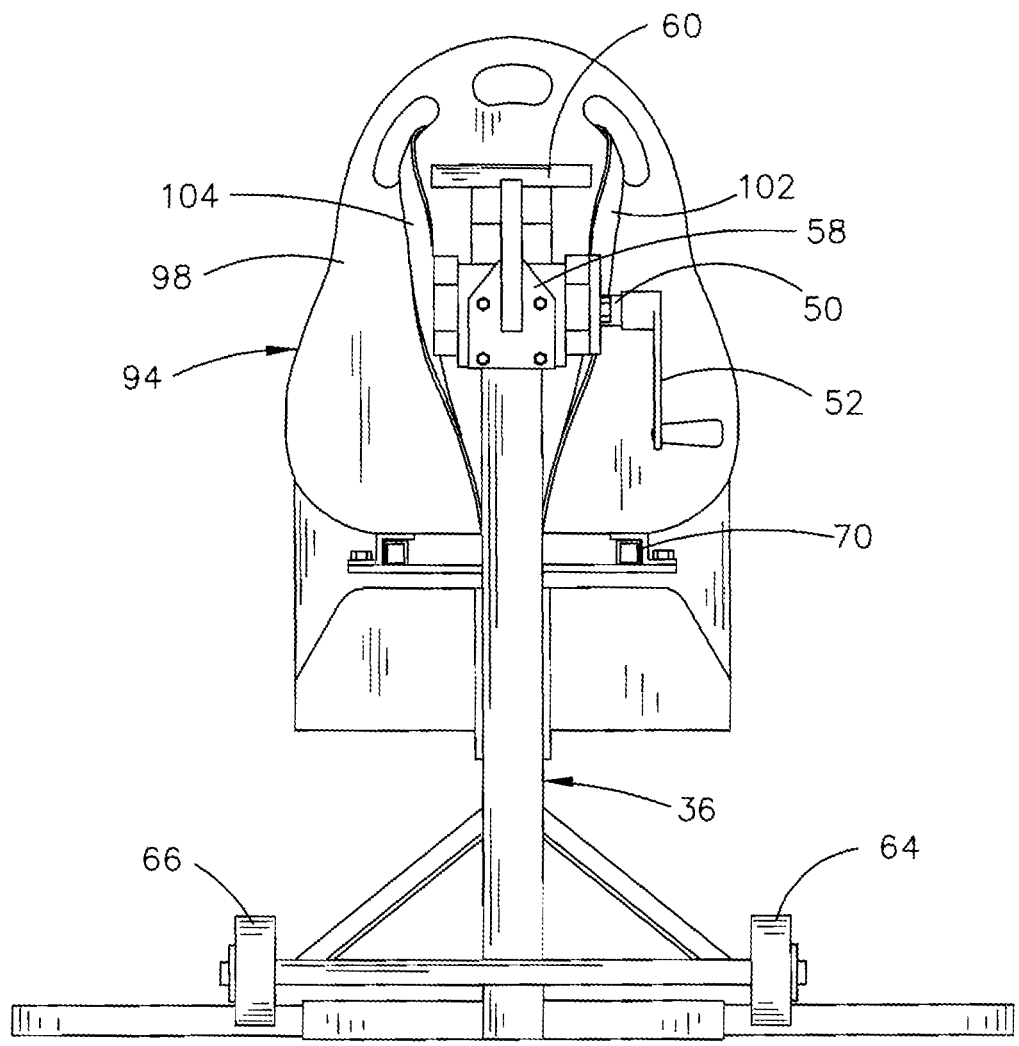
FIG. 3 is a rear view of the roll-over simulator of this invention.

The numeral 68 refers to a driver support frame which includes an elongated lower frame member 70 and an elongated frame member 72 which extends transversely upwardly from the rear end of frame member 70. A collar 74 is fixed to frame member 72 below the upper end thereof and has bracket 58 secured thereto by bolts or screws 76. A foot support frame 78 has its rear end selectively removably secured to the forward end of lower frame member 70 of driver support frame 68 by bolts 80. Foot support frame 78 includes a generally U-shaped foot support portion 82 at its forward end. Foot support frame 78 includes an upstanding frame portion 84 at its forward end as best seen in FIG. 2.

The numeral 86 refers to a steering wheel support which has its lower end selectively removably and selectively vertically adjustably secured to the upper end of frame portion 84 of foot support frame 78 by bolts 88.

The numeral 92 refers to a seat frame which is secured to frame member 70 of driver support frame 68 by any convenient means. Seat 94 is attached to seat frame 92 in conventional fashion. Seat 94 includes a seat portion 96 and a back portion 98. The numeral 100 refers to a seat and shoulder belt assembly. Seat and shoulder belt assembly 100 includes shoulder belts 102 and 104 which have one ends thereof secured to lower frame member 70. Belts 102 and 104 extend upwardly from frame member 70 and through openings 106 and 108 respectively formed in back portion 98 of seat 94. The free ends of belts 102 and 104 are selectively attached to a connector 110. Preferably, the connector 110 is a rotary buckle such as marketed by Schroth Safety Products. Assembly 100 also includes seat belts 112 and 114 which have one ends thereof secured to frame member 70. Belts 112 and 114 extend upwardly from frame member 70 and through openings 116 and 118 respectively formed in seat portion 96. The other ends of belts 112 and 114 are selectively attached to the connector 110.

Figure 4:
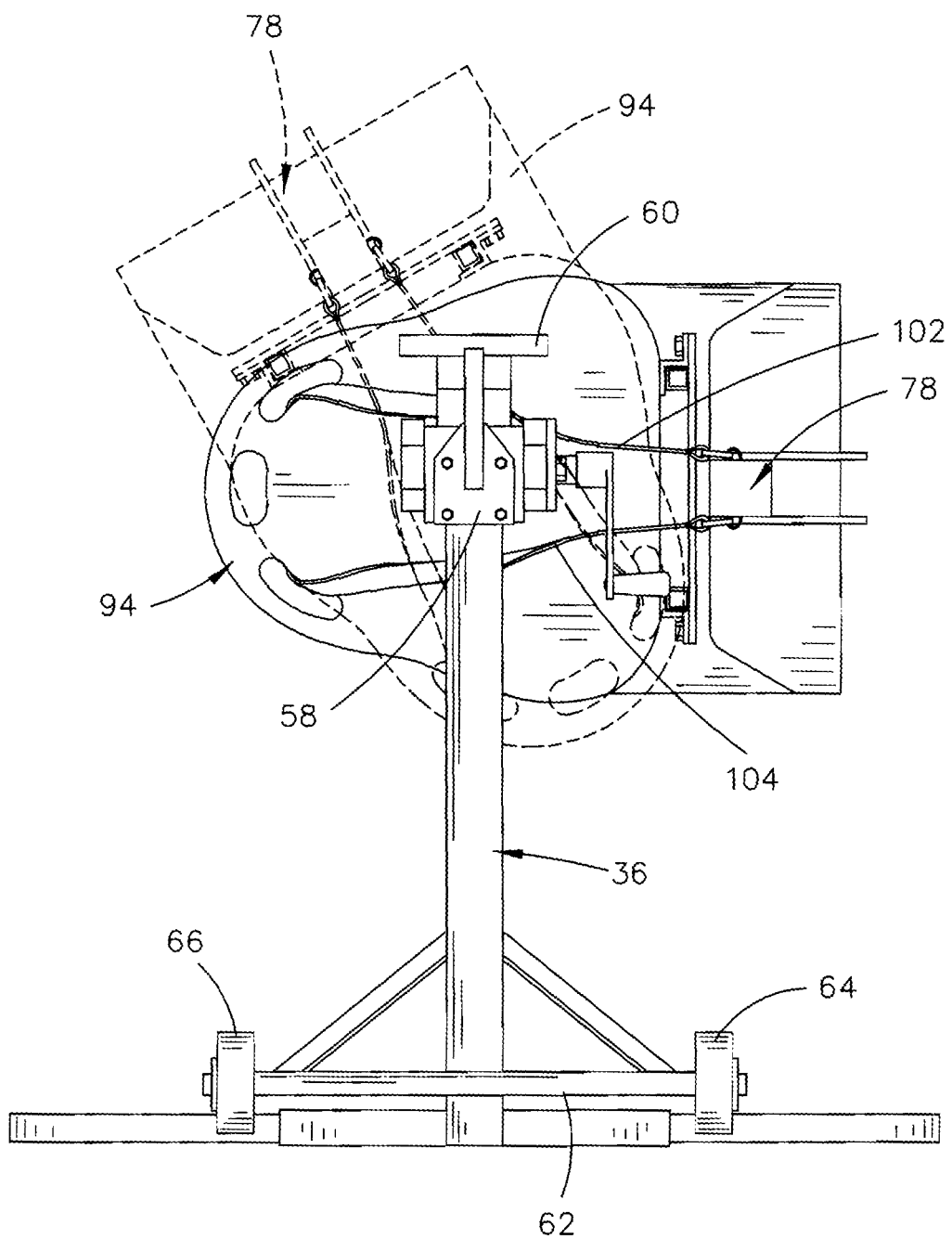
FIG. 4 is a rear view of the roll-over simulator of this invention with the driver seat rolled over 90° and with the broken lines indicating the driver seat in a substantially inverted position.
Figure 5:
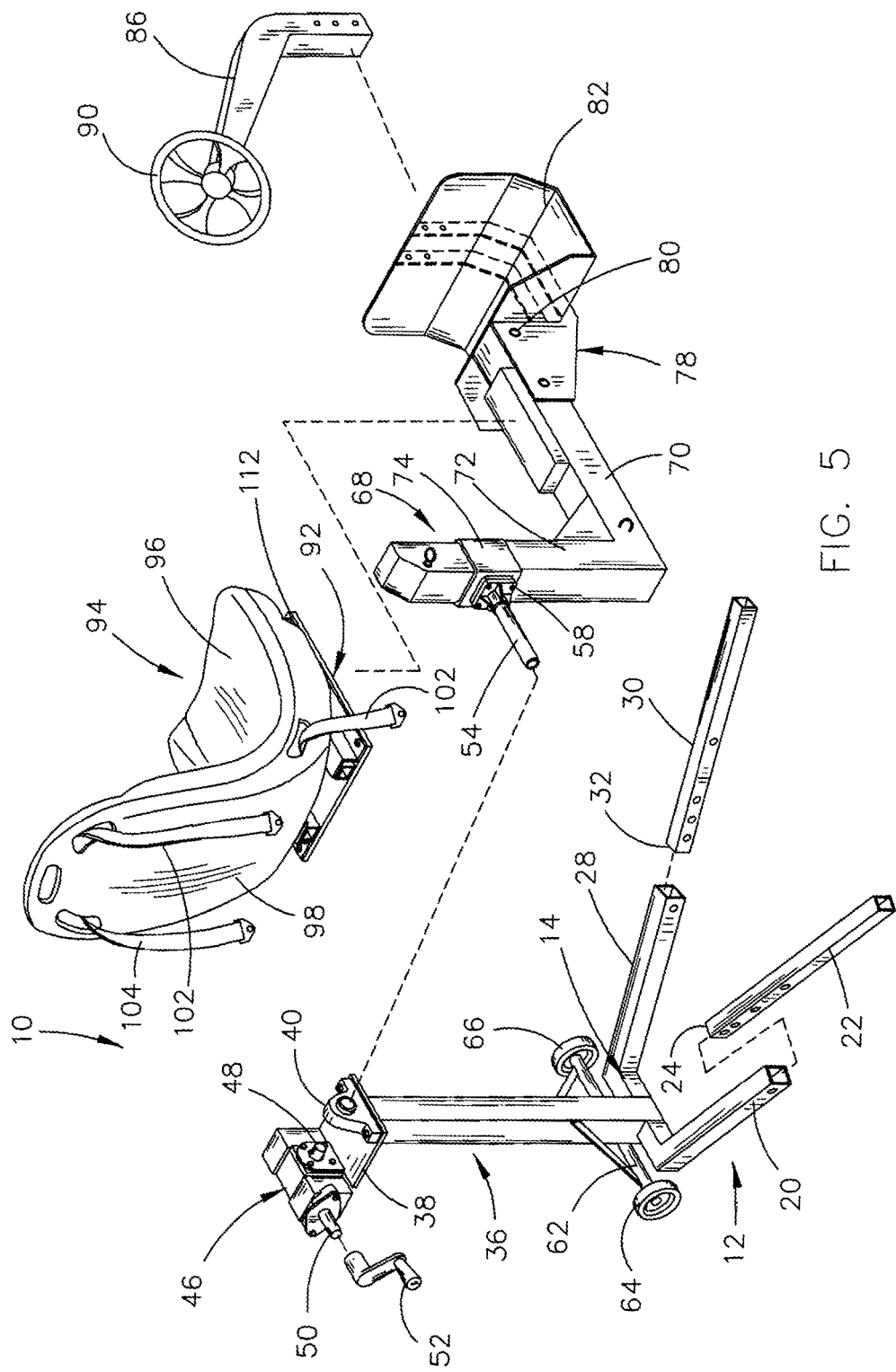
FIG. 5 is an exploded perspective view of the roll-over simulator of this invention.
Figure 6:
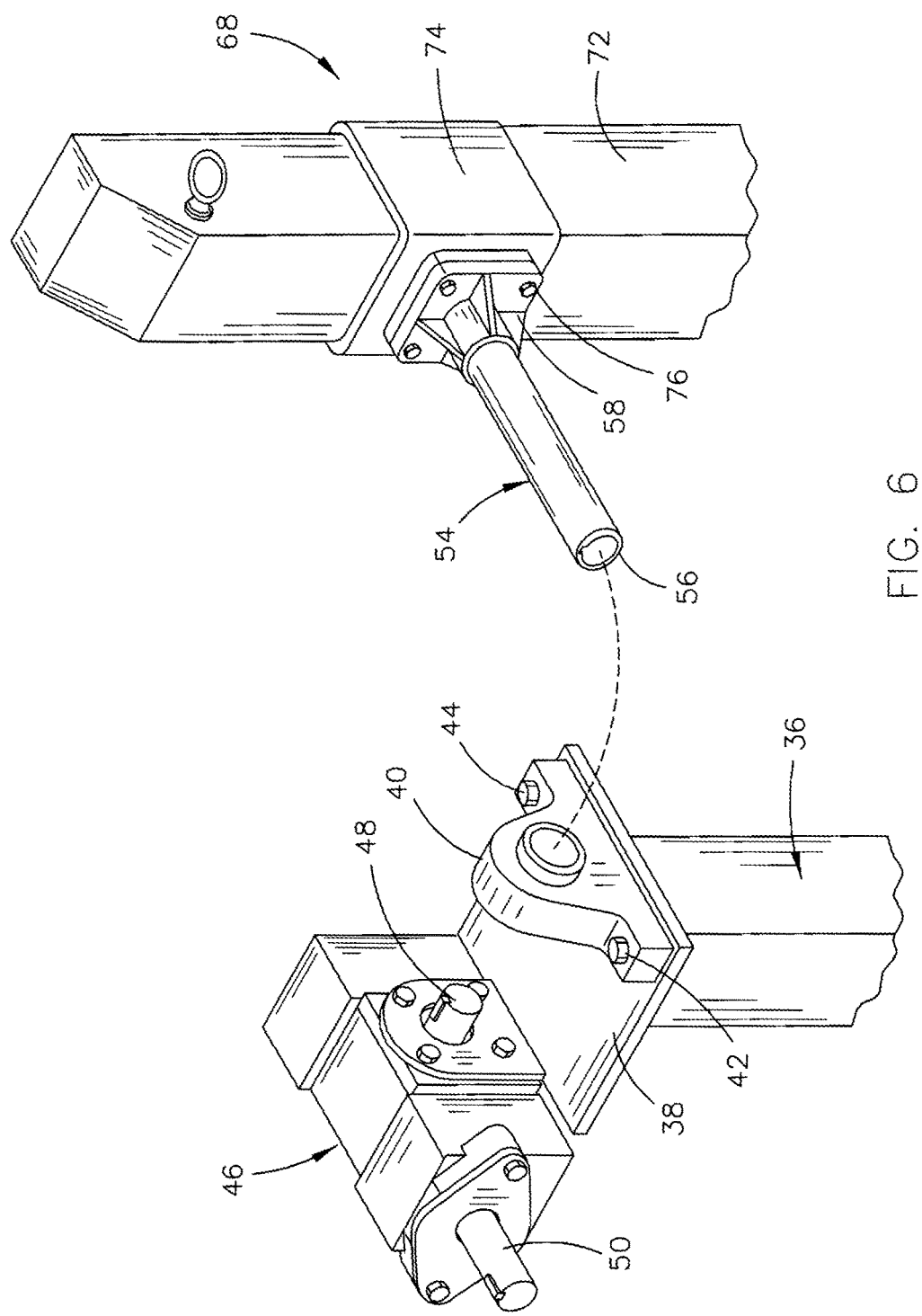
FIG. 6 is a partial exploded perspective view of one form of the means for rotating the driver seat of this invention.

In use, the simulator will be completely assembled as seen in FIG. 1. At that time, the belts 102, 104, 112 and 114 will be disconnected from connector 110. The person will then be seated in the seat 94. The free ends of the belts 102 and 104 will then be connected to connector 110. The free ends of the belts 112 and 114 will then be connected to the connector 110 which results in the person being securely and safely held in the seat 94. The crank handle 52 if not already secured to shaft 50, will be secured to shaft 50. The crank handle 52 will then be rotated which causes shaft 54 to be rotated which in turn causes driver support frame 68, foot support frame 78 and steering wheel support 86 to be rotated from its starting or upright position (FIG. 1), to an inverted position such as indicated by broken lines in FIG. 4. The shoulder belts 102, 104 and the seat belts 112 and 114 safety maintain the person in the seat 94 thereby indicating to the person in the seat 94 that he/she will be maintained in the seat 94 during a vehicle roll-over to emphasize the need for persons to utilize the seat belts of the vehicle which they may be driving.

The simulator 10 may be easily moved from classroom to another by a person grasping the handle 60 and pivotally raising the forward end of the simulator 10 so that wheels 64 and 66 are lowered into floor engagement. The simulator 10 may then be easily moved to another classroom. If it is desired to move the simulator 10 to a distant location, the tubular frame members 22 and 30 may be detached from frame members 20 and 29 respectively. Further, the steering wheel support 86 may be detached from frame portion 84. Additionally, foot support frame 78 may be detached from the driver support frame 68. Thus, the components of the simulator 10 may be easily transported to another location for assembly at that location.

Thus it can be seen that the invention accomplishes at least all of its stated objectives.

Although the invention has been described in language that is specific to certain structures and methodological steps, it is to be understood that the invention defined in the appended claims is not necessarily limited to the specific structures and/or steps described. Rather, the specific aspects and steps are described as forms of implementing the claimed invention. Since many embodiments of the invention can be practiced without departing from the spirit and scope of the invention, the invention resides in the claims hereinafter appended.

I claim:

1. A vehicle roll-over simulator, comprising:
a horizontally disposed lower support frame having a front end, a rear end, a first side and a second side;
said lower support frame configured to be positioned on a horizontally disposed surface;
a vertically disposed support post having upper and lower ends;
said lower end of said support post being secured to said lower support frame at said rear end of said lower support frame between said first and second sides of said lower support frame;
a horizontally disposed drive shaft rotatably mounted on said upper end of said support post;
said drive shaft having a rear end and a front end;
a drive means connected to said drive shaft for selectively rotating said drive shaft in at least a first direction;
a driver support frame having a rear end, a front end, a first side and a left side;
said rear end of said driver support frame operatively secured to said front end of said drive shaft for rotation therewith about a horizontal axis;

a driver seat mounted on said driver support frame;
said driver seat including a seat portion and a back portion configured to support a person thereon;
a foot support frame having a rear end and a front end;
said rear end of said foot support frame being secured to said front end of said driver support frame;
said foot support frame including a foot rest positioned forwardly of and below said seat portion of said driver seat;
a steering wheel support secured to said front end of said foot support frame which extends upwardly therefrom;
a steering wheel secured to said steering wheel support which is positioned forwardly of said back portion of said driver seat;
said driver seat support frame, said driver seat, said foot support frame and said steering wheel support being selectively rotatable from an upright position to a roll-over position by said drive shaft; and
a seat belt assembly secured to said driver seat frame which is configured to extend around a person sitting on said driver seat to maintain the person on said driver seat while said driver support frame is rotatably moved between said upright position to said roll-over position thereby simulating a vehicle roll-over situation.

2. The vehicle roll-over simulator of claim 1 wherein said drive means for rotating said drive shaft comprises a gear box and hand crank assembly.

3. The vehicle roll-over simulator of claim 1 wherein said lower support frame has a general V-shape.

4. The vehicle roll-over simulator of claim 1 wherein said lower support frame has a general truncated V-shape.

5. The vehicle roll-over simulator of claim 1 which said lower support frame includes elongated and spaced-apart first and second frame members which extend forwardly and outwardly from said lower end of said support post.

6. The vehicle roll-over simulator of claim 1 wherein said lower support frame includes:
    (a) an elongated and horizontally disposed first frame member, having forward and rearward ends, which extends forwardly and outwardly from said support post;
    (b) an elongated and horizontally disposed second frame member, having forward and rearward ends, which extends forwardly and outwardly from said support post;
    (c) an elongated and horizontally disposed third frame member, having forward and rearward ends, which is selectively removably secured to said forward end of said first frame member and which extends forwardly and outwardly therefrom; and
    (d) an elongated and horizontally disposed fourth frame member, having forward and rearward ends, which is selectively removably secured to said forward end of said second frame member and which extends forwardly and outwardly therefrom.

7. The vehicle roll-over simulator of claim 1 wherein said steering wheel support is selectively removably secured to said driver seat frame.

8. The vehicle roll-over simulator of claim 1 wherein a pair of transport wheels are secured to said support post at said lower end of said support post.

9. A vehicle roll-over simulator, comprising:
a horizontally disposed lower support frame having a front end, a rear end, a first side and a second side;
said lower support frame configured to be positioned on a horizontally disposed surface;
a vertically disposed support post having upper and lower ends;
said lower end of said support post being secured to said lower support frame at said rear end of said lower support frame between said first and second sides of said lower support frame;
a horizontally disposed drive shaft rotatably mounted on said upper end of said support post;
said drive shaft having a rear end and a front end;
a drive means connected to said drive shaft for selectively rotating said drive shaft in at least a first direction;
a driver support frame having a rear end, a front end, a first side and a left side;
said rear end of said driver support frame operatively secured to said front end of said drive shaft for rotation therewith about a horizontal axis;
a driver seat mounted on said driver support frame;
said driver seat including a seat portion and a back portion configured to support a person thereon;
a foot rest frame having a rear end and a front end;
a foot rest on said foot rest frame;
said rear end of said foot rest frame being selectively removably secured to said front end of said driver support frame;
a steering wheel support, having upper and lower ends, selectively removably secured to said front end of said foot rest frame and which extends upwardly therefrom;
a steering wheel secured to said upper end of said steering wheel support;
said driver seat support frame, said driver seat and said steering wheel support being selectively rotatable from an upright position to a roll-over position by said drive shaft; and
a restraint belt assembly secured to said driver seat frame which is configured to extend around a person sitting on said driver seat to maintain the person on said driver seat while said driver support frame is rotatably moved between said upright position to said roll-over position thereby simulating a vehicle roll-over situation.

10. The vehicle roll-over simulator of claim 9 wherein said seat restraint assembly includes:
    (a) a first shoulder belt having first and second ends with said first end thereof being secured to said driver seat frame;
    (b) said first shoulder belt being configured to extend over the person's right shoulder;
    (c) a second shoulder belt having first and second ends with said first end thereof being secured to said driver seat frame;
    (d) said second shoulder belt being configured to extend over the person's left shoulder;
    (e) a first seat belt having first and second ends with said first end thereof being secured to said driver seat frame;
    (f) said first seat belt being configured to extend around the person's right hip;
    (g) a second seat belt having first and second ends with said first end thereof being secured to said driver support frame;
    (h) said second seat belt being configured to extend around the person's left hip;
said second ends of first shoulder belt, said second shoulder belt, said first seat belt and said second seat belt being selectively connected together.

11. The vehicle roll-over simulator of claim 10 wherein said second ends of said first shoulder belt, said second shoulder belt, said first seat belt and said second seat belt are selectively connected together by a connector member.

12. The vehicle roll-over simulator of claim 11 wherein said connector member is a rotary buckle.

13. The vehicle roll-over simulator of claim 10 wherein said first shoulder belt, said second shoulder belt, said first seat belt and said second seat belts extend through openings formed in said driver seat.

\* \* \* \* \*